United States Patent [19]

Moore et al.

[11] 4,301,264
[45] Nov. 17, 1981

[54] EMULSION POLYMERIZATION PROCESS

[75] Inventors: John D. Moore, Hythe; Alan A. J. Feast, Chandlers Ford, both of England

[73] Assignee: I.S.R. Holding, S.a.r.l., Luxembourg, Luxembourg

[21] Appl. No.: 149,940

[22] Filed: May 14, 1980

Related U.S. Application Data

[63] Continuation of Ser. No. 971,094, Dec. 19, 1978, abandoned.

[30] Foreign Application Priority Data

Mar. 3, 1978 [GB] United Kingdom ................ 8546/78

[51] Int. Cl.³ .............................................. C08F 2/22
[52] U.S. Cl. ...................................... 526/86; 526/65; 526/81
[58] Field of Search ...................... 526/65, 66, 81, 86; 528/491

[56] References Cited

U.S. PATENT DOCUMENTS 3,547,857 12/1970 Murray ................................ 526/66

Primary Examiner—Paul R. Michl
Attorney, Agent, or Firm—Cushman, Darby & Cushman

[57] ABSTRACT

A process for reducing the residual monomer level of a polymer latex prepared by emulsion polymerization comprises exposing the latex in a separate vessel from that in which the main polymerization has been carried out to conditions under which free radicals are produced by a secondary catalyst added to the latex, the said catalyst being oil soluble or having an oil soluble component. In a preferred embodiment a polymer latex prepared by the emulsion polymerization of styrene alone or a mixture containing styrene having a residual styrene level not exceeding 0.1% based on latex volume may be obtained.

12 Claims, No Drawings

EMULSION POLYMERIZATION PROCESS

This is a continuation of application Ser. No. 971,094 filed Dec. 19, 1978, now abandoned.

This invention relates to emulsion polymerisation processes. In one particular embodiment it relates to emulsion polymerisation processes which are carried out to a high conversion of monomer to polymer.

In this specification the expression "emulsion polymerisation processes" includes both addition polymerisation processes and grafting processes which are carried out in emulsion.

Emulsion polymerisation processes have been employed for several decades in the preparation of polymers from vinyl and/or conjugated diene monomers. Initially such processes were used for the preparation of styrene-butadiene rubber (SBR). These processes were and still are generally carried out to a conversion of monomer to polymer of about 65% to maintain optimum properties in the rubber. More recently a wider range of emulsion polymerisation processes have been employed in the preparation of both solid polymers and polymer latices. In the preparation of many polymer latices it is possible to carry out the emulsion polymerisation process to high conversion levels, generally at least 90% without affecting adversely the properties of the latex. Polystyrene latices and carboxylated SBR latices are examples of such latices prepared by emulsion polymerisation. Acrylonitrile-butadiene-styrene (ABS) resins may be prepared by an emulsion grafting reaction likewise carried out to a high conversion.

No matter how high the conversion of monomer to polymer it is rarely possible or economic to achieve total conversion. There nearly always remains some residual monomer. This may be present in amounts of, for example, 0.5% to 5% or more. It is therefore usual to subject the latex to a stripping operation to remove the residual, unreacted monomer(s).

Even after such a stripping operation, residual monomer may remain in the latex, occluded in the polymer particles. Another disadvantage of the stripping stage is that capital investment for the equipment is required. Further, considerable amounts of energy are consumed in the operation since steam is normally employed. This is particularly the case where the monomer(s) to be stripped have a relatively high boiling point, for example, styrene (boiling point=146° C.), acrylonitrile (78° C.) and methacrylic acid (163° C.).

According to the present invention a process for reducing the residual monomer level of a polymer latex prepared by emulsion polymerisation comprises exposing the latex in a separate vessel from that in which the main polymerisation has been carried out to conditions under which free radicals are produced by a secondary catalyst added to the latex, the said catalyst being oil soluble or having an oil soluble component.

By this process the residual monomer level may be reduced to very low levels, generally below 0.1%, without the need for a stripping stage. Of course, if desired, some stripping of the latex may be carried out, but this is not necessary to achieve very low residual monomer levels.

The process is particularly applicable to latices prepared by the emulsion polymerisation of a vinyl aromatic monomer, such as styrene, alone or of a monomer mixture containing a vinyl aromatic monomer, for example, styrene/acrylonitrile and a mixture comprising butadiene, styrene and one or more unsaturated acids. Typical examples are carboxylated SBR latices and latices of ABS resins and polystyrene.

The secondary catalyst which is employed may be a thermally decomposable free radical initiator or a "redox" catalyst comprising an oxidising component and an activator component. The initiator is oil soluble or in the case of a redox catalyst one component, generally the oxidising component is oil soluble. We believe that using an oil soluble initiator or oxidising component is advantageous since migration to the inside of the polymer particles containing the residual monomer occurs thus producing free radicals exactly where required. Redox catalysts having an oil soluble oxidising component are preferred since such catalysts give a more controlled generation of free radicals at the polymer particle/water interface than is obtained by thermal decomposition alone. Further, the decomposition may be obtained exactly when required simply by addition of the activator component whereas, with a thermally decomposable initiator, free radicals may be generated as soon as the initiator is introduced into the latex. Therefore the use of a redox catalyst enables greater control to be exercised over the exposure of the latex to free radicals produced by the secondary catalyst.

Where the free radical initiator employed as secondary catalyst is thermally decomposable, it is preferable that the half life is in the range 15 minutes to 4 hours at 100° C. Examples of suitable oil soluble thermally decomposable free radical initiators are tertiary-butyl peroctoate, benzoyl peroxide and tertiary-butyl perpivalate. Oil soluble free radical initiators having a half life of longer than 4 hours at 100° C. should be employed as part of a redox system in combination with a water soluble activator, such as an amine, for example diethylene triamine (DET), triethylene tetramine (TET), or tetraethylene pentamine (TEP). Examples of such oxidising components are cumene hydroperoxide (CHP), tertiary-butyl hydroperoxide (TBHP), para-menthane hydroperoxide (PMHP) and diisopropyl benzene hydroperoxide (DIBHP). If ferrous iron has been used as part of the initiator of the main polymerisation, this will act as an activator to produce a redox secondary catalyst when the free radical initiator is added. However, it is still preferable in such cases to employ an amine activator. Examples of amounts of initiator/oxidising component which may be used are up to about 0.50 parts per hundred parts by weight of polymer (0.5 php), typical amounts being 0.15 or 0.30 php. Where an activator is employed this is preferably used in the weight ratio oxidising component to activator of, for example, 1:2 to 2:1.

The process is carried out in a separate vessel from that in which the main polymerisation has been carried out. This may be, for example, a storage vessel or unstirred tank. The main polymerisation may be a batch reaction or preferably a continuous reaction so that the vessel serves to receive the latex from the main polymerisation. The latex in the vessel is preferably at a temperature of 50° C. or more, dependent upon the secondary catalyst employed, so that free radicals are produced without external heat being applied.

In the case of an activated cumene hydroperoxide as secondary catalyst a temperature of 70° C. is very suitable. This enables a residual styrene content of 1.6% in a carboxylated latex to be reduced to about 0.02 to 0.05% or even less in about five hours. When treating a carboxylated latex (produced in acid medium) by the process of the invention it may be advantageous to increase the pH to, for example, about 9 by the addition of, for example, ammonia before adding the secondary catalyst, otherwise there is a risk of reaction between the acid latex and any alkaline component of the secondary catalyst, for example, diethylene triamine.

Although the latex is exposed to free radicals produced by the secondary catalyst in a separate vessel from that in which the main polymerisation has been carried out, it is not essential that the secondary catalyst is added to this separate vessel. Thus, provided that conditions under which free radicals are produced by the secondary catalyst are avoided in the main polymerisation, it is possible for the secondary catalyst or one component thereof to be added with the monomers and other components of the main polymerisation. For example, a hydroperoxide with a long half life may be included with the reactor charge of the main polymerisation, the activator initiating the production of free radicals by the secondary catalyst being added to the latex after the latex has been removed from the vessel in which the main polymerisation has been carried out. In such cases the activator may be added to the separate vessel or to the pipe connecting the two vessels. The latter procedure may be advantageous since it enables a better dispersion of the activator into the latex to be obtained. However, if desired, the secondary catalyst or the components thereof may be added to the separate vessel directly. The addition of the secondary catalyst or one or both components thereof may be carried out continuously or incrementally as desired. Continuous addition is preferable when the main polymerisation is carried out continuously.

It will be understood that the latex can be withdrawn from the vessel in which the main polymerisation has been carried out at any desired conversion. Thus it is not necessary to delay withdrawal until a conversion of 90% or more has been achieved. Thus the latex may be withdrawn at a conversion level of, for example, 80% and then treated by the process of the present invention in the separate vessel. It may well be that in most cases polymerisation would continue in the separate vessel without the addition of a secondary catalyst. However, exposure of the latex to conditions under which free radicals are produced by a secondary catalyst added to the latex in accordance with our invention enables the conversion of monomer to polymer to be carried out to a very high level, thus reducing the residual monomer level to a very low figure, generally not exceeding 0.1%. This is achieved both conveniently and economically. Very low residual monomer contents are increasingly required to meet present day health and safety standards.

The following Examples illustrate the invention.

(In these Examples references to parts are references to parts by weight per hundred parts dry weight of polymer-php).

EXAMPLE 1

A carboxylated styrene butadiene copolymer latex containing 60% bound styrene was prepared at 70° C. to 90° C. using ammonium persulphate as the initiator. After polymerisation the residual styrene content was analysed at 1.06% (based on the latex volume).

(a) A portion of this latex was treated with ammonia to adjust the pH to 9.0 and was then treated with a secondary catalyst comprising cumene hydroperoxide 0.16 parts and diethylene triamine 0.12 parts. This treated latex was then heated for 5 hours at 70° C. It was found that the residual styrene content had been reduced to 0.02%.

(b) For comparison the procedure of Example 1(a) was repeated using a water soluble catalyst (ammonium persulphate 0.15 parts and 0.3 parts). It was found that the residual styrene content was reduced to 0.2% in each case.

EXAMPLE 2

A carboxylated styrene butadiene copolymer latex containing 50% bound styrene was prepared as in Example 1. After polymerisation the residual styrene content was analysed at 0.6% (based on latex volume).

(a) A portion of this latex was treated with ammonia to increase the pH to 9.5 and then treated with a secondary catalyst comprising cumene hydroperoxide 0.16 parts and diethylene triamine 0.08 parts. The treated latex was heated for 15 hours at 70° C. to 90° C. It was found that the residual styrene content has been reduced to 0.01%.

(b) For comparison the procedure of Example 2(a) was repeated using ammonium persulphate 0.15 parts and 0.3 parts. It was found that the residual styrene content was reduced to 0.2% in each case.

EXAMPLE 3

A polystyrene latex was prepared using ammonium persulphate as initiator. After polymerisation the residual styrene content was analysed at 1.2 to 3.0% (based on the latex volume).

(a) A portion of this latex was treated with a secondary catalyst comprising cumene hydroperoxide 0.16 parts and diethylene triamine 0.12 parts. This was added to a separate vessel from that in which the main polymerisation had been carried out, the polymerisation still continuing in the separate vessel. After heating for 4 hours at 93° C. it was found that the residual monomer level was 0.1%.

(b) For comparison the procedure of Example 3(a) was repeated using ammonium persulphate 0.2 parts. The residual styrene content was reduced to 0.3%.

EXAMPLE 4

Samples of an acrylonitrile-butadiene-styrene latex were prepared by grafting styrene and acrylonitrile on to polybutadiene latex in a continuous emulsion polymerisation at 85° C. to 100° C. using an initiator of cumene hydroperoxide and ferrous iron/glucose activator. After polymerisation of latex samples were analysed for styrene and acrylonitrile, the levels of each being indicated in the table, (percent based on latex volume).

A secondary catalyst of cumene hydroperoxide (0.16 phr) and diethylene triamine (0.08 phr) was added to each and the latex samples heated for 4 hours at 85° C. This treatment gave a marked reduction both in residual styrene and acrylonitrile levels as shown in the table.

TABLE

| | Residual monomer | | | |
| --- | --- | --- | --- | --- |
| | After main polymerisation | | Secondary catalysis using CHP/DET 4 hrs. 85° C. | |
| ABS Sample | % Styrene | % ACN | % Styrene | % ACN |
| 1 | 0.6 | 0.74 | 0.09 | 0.13 |

TABLE-continued

| | Residual monomer | | | |
|---|---|---|---|---|
| | After main polymerisation | | Secondary catalysis using CHP/DET 4 hrs. 85° C. | |
| ABS Sample | % Styrene | % ACN | % Styrene | % ACN |
| 2 | 0.52 | 0.55 | 0.08 | 0.14 |

In this specification, the expression "vinyl aromatic monomer" includes both nuclear substituted vinyl aromatic monomers, such as ar-alkyl styrenes, and side chain substituted monomers, such as alpha alkyl styrenes (for example, alpha methyl styrene).

What we claim is:

1. A process for reducing the residual styrene monomer level of a polymer latex prepared by the emulsion polymerisation of styrene monomer alone, or of a monomeric mixture containing styrene monomer which polymerisation has been taken to a conversion of at least 90%, which comprises exposing the latex, in a separate vessel from that in which the main polymerisation has been carried out to conditions under which free radicals are produced by a secondary redox catalyst, said catalyst having two components, one of which is oil soluble, and at least one component of which is water soluble and is added to the latex, the only monomers in said separate vessel being those left over from said conversion and wherein the residual styrene is reduced to a level not exceeding 0.1% based on the latex volume.

2. A process for reducing the residual vinyl aromatic monomer level of a polymer latex prepared by the emulsion polymerisation of a vinyl aromatic monomer alone, or of a monomeric mixture containing a vinyl aromatic monomer which polymerisation has been taken to a conversion of at least 90% and there is present 0.5 to 5% of residual monomer in the latex which comprises exposing the latex in a separate vessel from that in which the main polymerisation has been carried out to conditions under which free radicals are produced by a secondary redox catalyst, said catalyst having two components, one of which is oil soluble, and at least one component of which is water soluble and is added to the latex, the only monomers in said separate vessel being those left over from said conversion and reducing the residual monomer to not over 0.1%.

3. A process according to claim 2 in which the oxidising component is cumene hydroperoxide, tertiary-butyl hydroperoxide, paramenthane hydroperoxide or diisopropyl benzene hydroperoxide.

4. A process according to claim 3 in which the activator component of the redox catalyst is diethylene triamine, triethylene tetraethylene pentamine.

5. A process according to claim 2 in which the oxidising component of the redox catalyst is included with the reactor charge of the main polymerisation, the activator component initiating the production of free radicals by the secondary catayst being added to the latex after the latex has been removed from the vessel in which the main polymerisation has been carried out.

6. A process according to claim 2 in which or the oil soluble component thereof is included with the reactor charge of the emulsion polymerisation, the conditions of the polymerisation being such that free radicals are not produced by the secondary catalyst during the polymerisation stage.

7. A process according to claim 6 in which there is included the oxidizing component of a redox catalyst with the reactor charge of the main polymerisation and the activator component initiating the production of free radicals by the secondary catalyst is added to the latex after the latex has been removed from the vessel in which the main polymerisation has been carried out.

8. A process according to claim 2 in which the polymer latex is selected from a polystyrene latex, an acrylonitrile butadiene styrene polymer latex and a carboxylated latex prepared by the polymerisation of a monomer mixture comprising butadiene, styrene and one or more unsaturated acids.

9. A process according to claim 2 wherein there is polymerized styrene alone and the amount of residual monomer initially present is not over 3%.

10. A process according to claim 9 wherein the amount of residual monomer initially present is 1.2 to 3%.

11. A process according to claim 2 in which the activator component of the redox catalyst is diethylene triamine, triethylene tetramine or tetraethylene pentamine.

12. A process according to claim 2 wherein the activator component is added to the latex.

* * * * *